(12) United States Patent
Kadle et al.

(10) Patent No.: US 7,238,101 B2
(45) Date of Patent: Jul. 3, 2007

(54) THERMALLY CONDITIONED VEHICLE SEAT

(75) Inventors: Prasad Shripad Kadle, East Amherst, NY (US); Edward Wolfe, IV, Amherst, NY (US); Joseph Pierre Heremans, Troy, MI (US); Donald T. Morelli, White Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 245 days.

(21) Appl. No.: 10/948,348

(22) Filed: Sep. 23, 2004

(65) Prior Publication Data
US 2005/0268621 A1 Dec. 8, 2005

Related U.S. Application Data

(60) Provisional application No. 60/572,691, filed on May 20, 2004, provisional application No. 60/577,624, filed on Jun. 7, 2004.

(51) Int. Cl.
*B60N 2/56* (2006.01)
(52) U.S. Cl. .................................................. 454/120
(58) Field of Classification Search ............. 454/120; 62/3.5, 3.61, 261, 3.3
See application file for complete search history.

(56) References Cited

U.S. PATENT DOCUMENTS 3,127,931 A * 4/1964 Johnson ..................... 165/43
4,874,036 A * 10/1989 Masuda ....................... 165/42
5,924,766 A 7/1999 Esaki .................... 297/180.13
6,079,485 A 6/2000 Esaki .......................... 165/43
6,119,463 A 9/2000 Bell .............................. 62/3.7
RE38,128 E 6/2003 Gallup ......................... 62/3.5
6,871,696 B2 * 3/2005 Aoki et al. .................. 165/43
2004/0102151 A1* 5/2004 Shikata et al. ............. 454/120

FOREIGN PATENT DOCUMENTS

WO WO99/58907 11/1999
WO 0130606 A 3/2001

OTHER PUBLICATIONS

EP 05 07 6080, European Search Report dated Apr. 24, 2006.

* cited by examiner

*Primary Examiner*—Gregory Wilson
(74) *Attorney, Agent, or Firm*—Patrick M. Griffin

(57) ABSTRACT

A thermoelectric device is disposed in series with the HVAC module for heating and cooling air $T_a$ from the HVAC module for delivery to seat passages of a seat assembly. The thermoelectric device includes a thermoelectric module, a heat exchanger having cold and hot sides, ductwork, a divider that sends variable air flow to the cold or hot sides of the thermoelectric module, and thermal insulation between the cold and hot sides downstream of the heat exchanger. The fan of the HVAC module is the sole motivation for moving the conditioned air $T_a$ originating from the central HVAC module through the thermoelectric device and to the seat assembly.

23 Claims, 2 Drawing Sheets

THERMALLY CONDITIONED VEHICLE SEAT

RELATED APPLICATIONS

This application claims the benefit of provisional applications 60/572,691 filed May 20, 2004 and 60/577,624 filed Jun. 07, 2004.

BACKGROUND OF THE INVENTION

1. Field of the Invention

The subject invention relates to a thermally air conditioned seat in an automotive vehicle by using air from the HVAC system of the vehicle.

2. Description of the Prior Art

The thermal comfort of passengers in a vehicle is conventionally provided by the central heating, ventilation and air conditioning (HVAC) module of the vehicle. Passengers are heated or cooled by convection through the surrounding medium in the interior of the vehicle. More recently, vehicle seating systems have been described that provide for dedicated heating and cooling of the occupant by an independent thermoelectrically energized unit incorporated into a vehicle seat. These units typically consist of one or more thermoelectric (TE) modules, heat exchangers, and fans, and are operated by allowing the fan to blow cabin air over the hot and cold sides of the thermoelectric, resulting in heat being absorbed from the air on the cold side and released to the air on the hot side. The cooled air is directed through or over the seat to the occupant's body surface, whereas the warmed air is rejected into the vehicle cabin, for instance under or behind the seat. Because these thermoelectrically climate controlled seats use cabin air as the medium, which generally is initially cold in heating mode and warm in cooling mode, there is necessarily a deliberate transient thermal response of the seating system.

The cooling and heating of a passenger in an automotive vehicle can most effectively be obtained by applying the thermal condition directly to the human being. The current automotive air conditioning systems utilize ducts at the floor to heat, and ducts leading to vents in the instrument panel to cool. The effectiveness in attempting to cool or heat occupants in an automobile is significantly lost to the surrounding air and thermal mass, as only part of the heat exchange is directed toward the passenger.

The optimum effect is attained by applying the conditioned air as directly as possible to the human passenger. This is accomplished by flowing conditioned air to the passenger seat from a known source like the HVAC module or a thermoelectric cooler/heater dedicated to the seat, as illustrated in U.S. Pat. No. Re. 38,128 to Gallup et al., U.S. Pat. No. 5,924,766 to Esaki et al., and U.S. Pat. No. 6,079,485 to Esaki et al., and PCT application WO 99/58907 to Bell.

However, the air from the HVAC module on initial startup is not thermally conditioned. In the case of heating, it takes time to warm the coolant due to the thermal inertia of the engine. In the case of cooling, it takes time for the typical Rankine A/C cycle to cool air. On the other hand, a dedicated thermoelectric device to heat or cool the ambient air from the vehicle cabin does have the thermal capacity vis-à-vis the electrical power available to provide optimum comfort. In other words, the electrical power required to energize the thermoelectric heat exchanger for adequate comfort is quite significant and sometimes not practical. In the heating mode, the passenger is not satisfied with the level of warmth. In cooling mode, the passenger is not satisfied with the cooling effect and even feels cold and clammy, as the thermoelectric does not dehumidify the air. The reason for this is that the dew point temperature is below the thermoelectric cooling temperature and little to no dehumidification takes place. When the humidity is very high in the passenger cabin, the thermoelectric device will collect condensed moisture without being able to eliminate it.

SUMMARY OF THE INVENTION AND ADVANTAGES

The subject invention provides thermally conditioned air to passages in a seat of an automotive vehicle having a HVAC module for supplying heating and cooling air to a cabin vent and is distinguished by exchanging heat with the heating and cooling air from the HVAC module in an auxiliary heat exchanger before delivery to the seat passages of the seat assembly, i.e., by an auxiliary air-conditioning device in the ductwork between the HVAC module and the seat passages of the seat assembly.

Therefore, the subject invention provides a thermoelectric device in series with thermally conditioned air from an HVAC module to provide the ultimate comfort to the passenger upon initial warm-up and cool down, and in steady state operation. The invention differs from the prior art by using preconditioned air from the HVAC module rather than cabin air for the hot and cold side of a thermoelectric device. The placement of the thermoelectric device in series with the HVAC increases the effectiveness in cooling or heating the passenger and significantly reduces the initial time to reach the desired comfort level of the seat occupant, i.e., a faster cool-down in the cooling mode and/or warm-up in the heating mode of the vehicle seat than would otherwise be obtained using unconditioned air flows.

Because the thermoelectric device operates using preconditioned HVAC module air, the temperature range, $-7°$ C.$-27°$ C., of operation is narrower than in known systems, $-15°$ C.$-40°$ C., in the first 2–10 minutes of operation and the average temperature of operation is shifted to a lower temperature (from $27.5°$ C. to $10°$ C.).

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
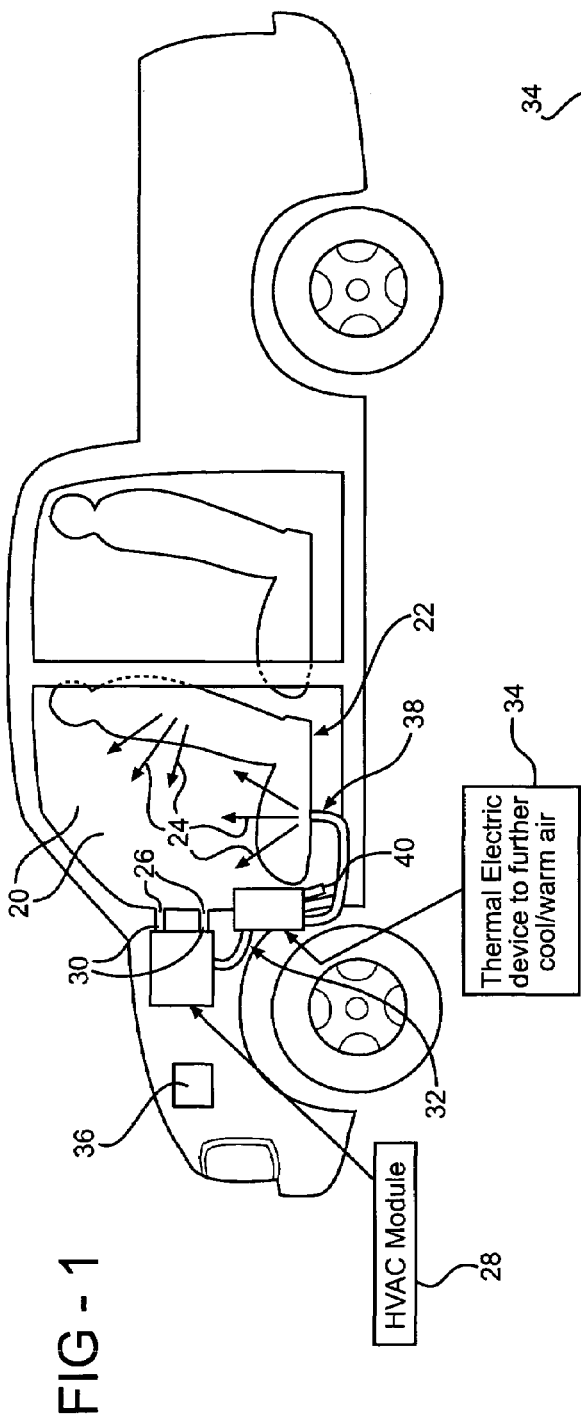
FIG. 1 is a schematic view of an automotive vehicle combined with the auxiliary air-conditioning device for thermally conditioning a seat assembly in the vehicle.
Figure 2:
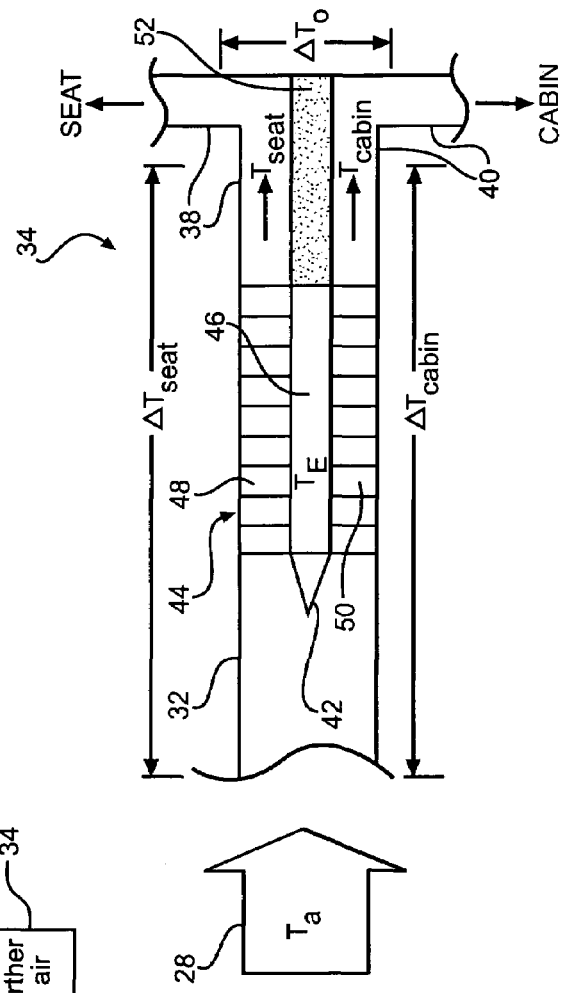
FIG. 2 is a schematic view of the auxiliary air-conditioning device.

Referring to the Figures, an automotive vehicle is illustrated in FIG. 1 and an auxiliary air-conditioning device is illustrated in FIG. 2.

The automotive vehicle includes a body defining a passenger cabin 20. A seat assembly 22 is disposed in the cabin 20 and has seat passages 24 for thermally conditioning a seat occupant with air, e.g., the vehicle seat assembly 22 may have a perforated seat cushion that will allow air to pass through.

The cabin 20 has at least one and normally a plurality of cabin vents 26 in the vehicle for conveying air into the cabin 20. A well known HVAC module 28 supplies heating and cooling air and cabin ductwork 30 conveys the heating and cooling air from the HVAC module 28 to the cabin vent 26 and seat, ductwork 32 conveys the heating and cooling air from the HVAC module 28 to the seat passages 24 of the seat assembly 22.

An auxiliary air-conditioning device comprising a thermo-electric device 34 is disposed in the seat ductwork 32 for heating and cooling air from the HVAC module 28 for delivery to the seat passages 24 of the seat assembly 22. The vehicle includes an electrical system 36 including a battery and an alternator for supplying electrical power and the thermo-electric device 34 is connected electrically to the electrical system 36 for receiving electrical power there from. The thermo-electric device 34 includes a seat side 38 and a cabin side 40 that include a seat duct for conveying air from the seat side 38 to the seat passages 24 and a cabin 20 duct for conveying air from the cabin side 40 to a cabin vent 26.

As alluded to above, the ductwork 32 includes a HVAC duct for conveying air from the HVAC module 28 to the auxiliary air-conditioning device, and a flow divider 42, illustrated as a pointed wall, is disposed in the HVAC duct for dividing air between the seat and cabin sides 40 of the auxiliary air-conditioning device from the HVAC module 28. The wall 42 divides air from the HVAC module 28 for passing through the seat side 38 and the cabin side 40.

The auxiliary air-conditioning device includes a heat exchanger 44 disposed between the seat 38 and cabin 40 sides for transferring heat therebetween. More specifically, the heat exchanger 44 includes a thermoelectric element or module 46 disposed between the seat and cabin sides 40 with a first heat exchanger 48 on the seat side of the thermoelectric element 46, and a second heat exchanger 50 on the cabin side 40 of the thermoelectric element 46. A thermal insulation 52 is between the seat 38 and cabin 40 ducts downstream of the auxiliary air-conditioning device 34 for inhibiting the transfer of thermal energy between the seat 38 and cabin 40 ducts.

The auxiliary air-conditioning device 34 may be supported by the seat assembly 22 for efficiency and response time, as discussed below, or mounted in vehicle close thereto via the seat duct being flexible for allowing relative movement between the said seat assembly and the auxiliary air-conditioning device.

As will be appreciated, the invention provides a method of providing thermally conditioned air to passages 24 in a seat 22 of an automotive vehicle having a HVAC module 28 for supplying for supplying heating and cooling air to a cabin vent 26 wherein the method comprises the steps of delivering heating and cooling air from the HVAC module 28 to the seat passages 24 of the seat assembly 22, and exchanging heat with the heating and cooling air from the HVAC module 28 by an auxiliary heat exchange 34 before delivery to the seat passages 24 of the seat assembly 22.

The step of utilizing an auxiliary air-conditioning device 34 is further defined as utilizing electrical power from the vehicle electrical system 36 to drive the auxiliary heat exchange.

The method is further defined as dividing 42 the heating and cooling air from the HVAC module 28 into a seat side 38 and a cabin side 40 and the step of exchanging heat is further defined as exchanging heat between the seat side 38 and the cabin side 40. The method continues by conveying air from the seat side 38 to the seat passages 24 and conveying air from the cabin side 40 to the cabin via a cabin vent 26. The method further includes the step of dividing 42 air from the HVAC module 28 between the seat 38 and cabin 40 sides. The method also includes inhibiting 52 the transfer of thermal energy between the air from the seat side 38 to the seat passages 24 and the air from the cabin side 40 to the cabin vent 26. The method is most efficient by conveying the heating and cooling air from the HVAC module 28 to the seat passages 24 solely by an air mover in the HVAC module 28. In other words, there is no air movement or propulsion device between the HVAC module 28 and the seat assembly 22.

The air will be supplied from the HVAC module 28 after a mixing chamber to allow thermally conditioned dry air to enter a set of ductwork 32. The supplied air will then enter the thermoelectric device 34 placed as close as possible to the seat assembly 22, as alluded to above, preferably supported on the seat assembly 22. The placement of the thermal electric device 34 as close as possible to the seat assembly 22 is important to the efficiency of the inventive combination and to minimize the empty or static air between the seat 22 and thermoelectric heat device 34 that would not be conditioned on initial startup of the vehicle.

The current invention supplies conditioned air to the seat assembly 22 at a low flow rate, typically around five to ten percent (5–10%) of the total airflow to each seat at high blower setting and diminishing to one to two percent (1%–2%) of total airflow to each seat at low blower setting. A typical airflow percentage for each seat is set forth in this table:

TABLE

Typical Seat Airflow Percentages
Percent of Total Airflow Directed Toward Seats

| Blower setting | Driver Seat Airflow | Passenger Seat Airflow |
| --- | --- | --- |
| HI | 5%–10% | 5%–10% |
| M1 | 3.5%–7% | 3.5.%–7% |
| M2 | 1.5%–3% | 1.5.%–3% |
| LO | 1%–2% | 1%–2% |

However, conditioned air from an HVAC module 28 takes time to warm the air depending upon the temperature of the coolant or of the refrigerant. The initial warm-up and cool down can be accelerated as the thermoelectric device 34 operates for the first few minutes, then the HVAC module 28 conditioned air is utilized to comfort the passenger. These modules and devices will work in combination to provide the optimal cooling or heating with minimal electrical power consumption.

The thermoelectric subassembly or device 34 shown in FIG. 2 to supply conditioned air to the heated and cooled seat assembly 22 includes a thermoelectric element 46, seat 48 and cabin 50 side heat exchangers, ductwork 32, a divider 42 that sends air flow to the seat 48 or cabin 50 side of the thermoelectric element 46, and thermal insulation 52 downstream from the heat exchanger 44. The air $T_a$ originating from the central HVAC module 28 of the vehicle is propelled through the thermoelectric device 34 by the fan built into the HVAC module 28, the fan of the HVAC module 28 being the sole motivation for moving the conditioned air $T_a$ to the seat assembly 22. A fraction $T_{seat}$ of the air $T_a$ from the HVAC module 28, determined by the flow divider 42, or other dividing device, serves to heat or cool the seat 22, the other fraction $T_{cabin}$ is used to manage the heat load imposed by the thermoelectric element 46 and is dumped into the cabin 20. The seat 48 and cabin 50 side of the heat exchanger 44 utilize air flows originating from the main HVAC module 28 of the vehicle as opposed to air from the cabin 20. By the use of the appropriate ductwork 32 and thermal insulation 52, a fraction $T_{seat}$ of the preconditioned air $T_a$ from the HVAC module 28 may be directed over the seat side 38 of the heat exchanger 44 and to the seat assembly 22, the remaining fraction $T_{cabin}$ being directed over the cold side 50 of the heat exchanger 44 and to the cabin 20; these fractions being fixed at an optimum value by the shape of the proportioning fixed flow divider 42.

Figure 3:
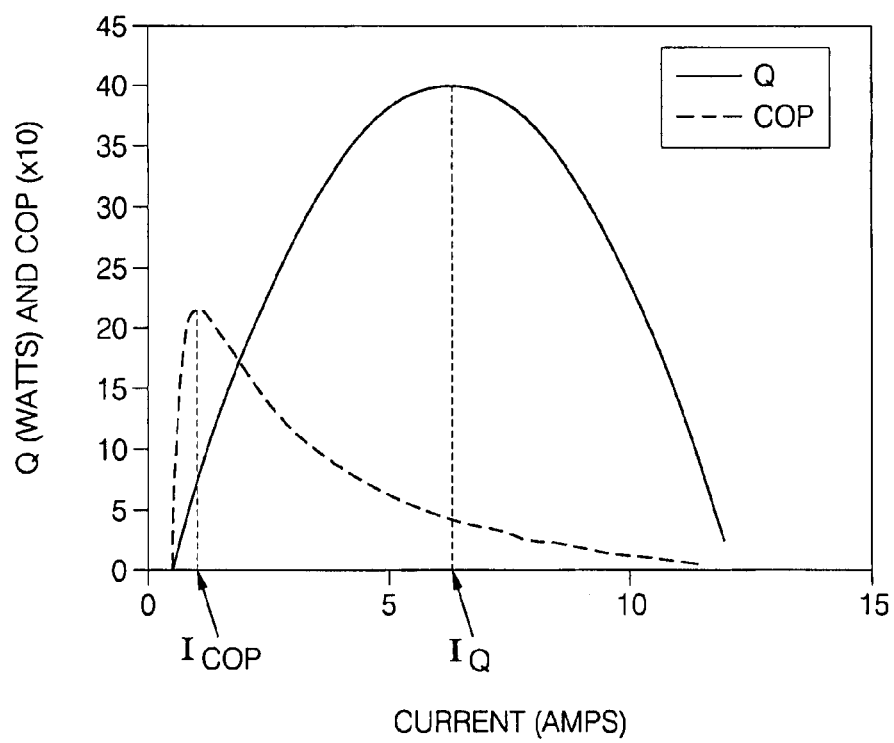
FIG. 3 is a graph depicting the resulting dependencies of Q and COP on I.

In operation, the HVAC module 28 directs pre-cooled (in cooling mode) or preheated (in heating mode) air ($T_a$) from the HVAC module 28 over the seat and cabin sides of the Thermoelectric (TE) device 34. This TE device 34, driven by an electrical current I, causes further cooling or heating of the air on the cold side of the TE device 34, and the heat absorbed from the cold side is pumped to and liberated from the hot side via the hot side 50 of the heat exchanger 44. Two important parameters of a TE device 34 are the cooling power Q and the coefficient of performance (or refrigerating efficiency) COP. The efficiency of any cooling system, be it a vapor-compression system or a thermoelectric system, is defined as the Coefficient of Performance (COP), which is, by definition, the amount of heat extracted on the cold side divided by the work (electric energy) required, W: COPC=$Q_c$/W. Cooling power, Q, and coefficient of performance, COP, are a function of the current (I) in the TE device 34 and the seat 48 and cabin 40 side temperatures $T_{seat}$ and $T_{cabin}$, respectively. When the auxiliary air conditioning device is in the cooling mode, $T_c = T_{seat}$ and $T_h = T_{cabin}$ and the expressions for COP and Q can be expressed as the following:

$$Q = SIT_C - K\Delta T - \frac{1}{2}I^2R \text{ and} \quad (1)$$

$$COP = \frac{SIT_C - K\Delta T - \frac{1}{2}I^2R}{I(S\Delta T + IR)} \quad (2)$$

where S is the thermoelectric power of the module (in units of V/K), K is the module thermal conductance (in W/K), and R is the module resistance (in ohms); $\Delta T = T_H - T_C$. For example, for Tavg=20° C.=(½)(Th+Tc), typical values for the thermoelectric parameters (see for instance www.ferrotec.com) are S=0.053 V/K, K=0.51 W/K, and R=2.4 ohm. The resulting dependencies of Q and COP on I are shown in FIG. 3.

Conventional TE devices are operated such that either the COP, or the cooling power Q is maximized. When optimized for COP, the TE device is driven at current $I_{COP}$. This results, however, in a very low cooling power. If operated over a short period of time, however, the device may be operated at the current $I_Q$ that maximizes the cooling power. Although this higher pumping capacity takes place at a lower COP, the TE device is operated at this current for only a short period of time. After a predetermined time period, the air $T_a$ originating from the vehicle HVAC module 28 has cooled sufficiently that the current I of the TE device 34 may be turned down to $I_{COP}$ cop to maximize its cooling efficiency.

The main advantage of the series HVAC module 28 and thermoelectric device 34 for seat cooling is that the steady-state cooling can be handled mostly by the HVAC module 28, so that the thermoelectric device 34 can be optimized mainly for maximum cooling power. When operated in this scenario the seat climate control system has an improved transient response relative to a similar system that uses air originating from the cabin 20 for heat exchange.

In the operation of the climate control system, the TE device 34 is operated initially at a current that maximizes cooling or heating capacity and then, after a predetermined time period, it is operated at a lower current level, thereby improving the transient heating/cooling of the seat 22 relative to a climate control system using cabin air as the heat exchange medium.

The thermoelectric device 34 can be designed for cooling power, as opposed to COP. It is known in the art that thermoelectric devices are optimum for COP when they a have a high "thermoelectric figure of merit", Z, defined as:

$$Z = S^2/\rho\kappa$$

where S is the Seebeck coefficient, ρ is the electrical resistivity and κ the thermal conductivity. To design a thermoelectric device 34 for maximum cooling power, set the derivative of equation (1) above with respect to current equal to zero, solve for current I, and then substitute that current into the same equation to obtain the maximum cooling power, resulting in:

$$Q_{max} = \frac{S^2 T_C^2}{2R} - K\Delta T. \quad (4)$$

Considering this equation (4), the optimum thermoelectric device 34 has a high Seebeck coefficient and a low electrical resistance, a property that is dependent on geometry. The optimum is now also relatively independent of thermal conductance during the transient, as, by definition, the temperature gradient starts at zero and remains relatively small (<10° C.) during the entire duration of the transient. The geometry of the thermoelectric device can be optimized for this typical application.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An automotive vehicle comprising;
    a body defining a passenger cabin,
    a seat assembly disposed in said cabin and having seat passages for thermally conditioning a seat occupant with air,
    at least one cabin vent in said vehicle for conveying air into said cabin,
    a HVAC module for supplying heating and cooling air, ductwork for conveying said heating and cooling air from said HVAC module to said cabin vent and to said seat passages of said seat assembly, and an auxiliary air-conditioning device in said ductwork and in series with said HVAC for heating and cooling air from said HVAC module for delivery to said seat passages of said seat assembly.

2. An automotive vehicle as set forth in claim 1 including an electrical system for supplying electrical power and wherein said auxiliary air-conditioning device comprises a thermo-electric device connected electrically to said electrical system for receiving electrical power therefrom.

3. An automotive vehicle as set forth in claim 2 wherein said auxiliary air-conditioning device includes a seat side and a cabin side and said ductwork includes a seat duct for conveying air from said seat side to said seat passages and a cabin duct for conveying air form said cabin side to said cabin vent.

4. An automotive vehicle as set forth in claim 3 wherein said ductwork includes a HVAC duct for conveying air from said HVAC module to said auxiliary air-conditioning device, and a flow divider in said HVAC duct for dividing air between said seat and cabin sides of said auxiliary air-conditioning device from said HVAC module.

5. An automotive vehicle as set forth in claim 4 wherein said dividing device includes a wall for dividing air from said HVAC module.

6. An automotive vehicle as set forth in claim 1 wherein said auxiliary air-conditioning device includes a seat side and a cabin side and a heat exchanger disposed between said seat and cabin sides for transferring heat therebetween, and said ductwork includes a seat duct for conveying air from said seat side to said seat passages and a cabin duct for conveying air form said cabin side to said cabin vent.

7. An automotive vehicle as set forth in claim 6 wherein said seat duct is flexible for allowing relative movement between said auxiliary air-conditioning device and said seat assembly.

8. An automotive vehicle as set forth in claim 1 wherein said auxiliary air-conditioning device is supported by said seat assembly.

9. An automotive vehicle comprising;
a body defining a passenger cabin,
an electrical system for supplying electrical power
a seat assembly disposed in said cabin and having seat passages for thermally conditioning a seat occupant with air,
at least one cabin vent in said vehicle for conveying air into said cabin,
an HVAC module for supplying heating and cooling air,
ductwork for conveying said heating and cooling air from said HVAC module to said cabin vent and to said seat passages of said seat assembly,
a thermo-electric device connected electrically to said electrical system for receiving electrical power therefrom in said ductwork for heating and cooling air from said HVAC module for delivery to said seat passages of said seat assembly,
said thermo-electric device including a seat side and a cabin side and said ductwork including a seat duct for conveying air from said seat side to said seat passages and a cabin duct for conveying air form said cabin side to said cabin vent,
said ductwork including a HVAC duct for conveying air from said HVAC module to said thermo-electric device, a flow divider in said HVAC duct for dividing air between said seat and cabin sides of said thermo-electric device from said HVAC module, and thermal insulation between said seat and cabin ducts downstream of said thermo-electric device for inhibiting the transfer of thermal energy between said seat and cabin ducts.

10. An auxiliary air-conditioning device for heating and cooling air from an HVAC module in a vehicle for delivery to seat passages of a seat assembly in the vehicle, said device comprising;
a HVAC duct for conveying air from the HVAC module to said auxiliary air-conditioning device,
a seat duct for conveying air from said auxiliary air-conditioning device to the seat passages, and
a heat exchanger in series with said ducts for heating and cooling air from said HVAC duct for delivery to said seat duct and to the seat passages of a seat assembly in the vehicle.

11. An auxiliary air-conditioning device as set forth in claim 10 wherein said auxiliary air-conditioning device comprises a thermo-electric device for receiving electrical power from the electrical system of the vehicle.

12. An auxiliary air-conditioning device as set forth in claim 11 wherein said auxiliary air-conditioning device includes a seat side and a cabin side, a cabin duct for conveying air form said cabin side to a cabin vent in the vehicle, said seat duct being disposed for conveying air from said seat side to the seat passages.

13. An auxiliary air-conditioning device as set forth in claim 12 including a dividing device in said HVAC duct for dividing air between said seat and cabin sides of said auxiliary air-conditioning device from the HVAC module.

14. An auxiliary air-conditioning device as set forth in claim 13 wherein said dividing device includes a wall for dividing air from said HVAC module.

15. An auxiliary air-conditioning device as set forth in claim 12 wherein said heat exchanger is disposed between said seat and cabin sides for transferring heat therebetween, and said seat duct being disposed for conveying air from said seat side to the seat passages and including a cabin duct for conveying air form said cabin side to a cabin vent in the vehicle.

16. An auxiliary air-conditioning device as set forth in claim 12 wherein said heat exchanger includes a thermo-electric module between said seat and cabin sides, a first heat exchanger on said seat side of said module, and a second heat exchanger on said cabin side of said module.

17. A thermo-electric device for receiving electrical power from a vehicle and for heating and cooling air from an HVAC module in the vehicle for delivery to seat passages of a seat assembly in the vehicle, said device comprising;
an HVAC duct for conveying air from the HVAC module to said thermo-electric device,
a seat duct for conveying air from said thermo-electric device to the seat passages,
a heat exchanger for heating and cooling air from said HVAC duct for delivery to said seat duct and to the seat passages of a seat assembly in the vehicle,
said thermo-electric device including a seat side and a cabin side,
a cabin duct for conveying air form said cabin side to a cabin vent in the vehicle,
said seat duct being disposed for conveying air from said seat side to the seat passages, a dividing device in said HVAC duct for dividing air between said seat and cabin sides of said thermo-electric device from the HVAC module, and thermal insulation between said seat and cabin ducts downstream of said thermo-electric device for inhibiting the transfer of thermal energy between said seat and cabin ducts.

18. A method of providing thermally conditioned air to passages in a seat of an automotive vehicle having a HVAC module for supplying for supplying heating and cooling air to a cabin vent, said method comprising the steps of;

delivering heating and cooling air from the HVAC module to the seat passages of the seat assembly, and exchanging heat with the heating and cooling air from the HVAC module by an auxiliary heat exchange in series with the HVAC before delivery to the seat passages of the seat assembly.

19. A method as set forth in claim 18 wherein the step of exchanging heat is further defined as utilizing electrical power from the vehicle electrical system to drive the auxiliary heat exchange.

20. A method as set forth in claim 18 further defined as dividing the heating and cooling air from the HVAC module into a seat side and a cabin side and said step of exchanging heat is further defined as exchanging heat between said seat side and said cabin side, and conveying air from the seat side to the seat passages and conveying air from the cabin side to the cabin vent.

21. A method as set forth in claim 20 including the step of dividing air from the HVAC module between the seat and cabin sides.

22. A method as set forth in claim 20 including inhibiting the transfer of thermal energy between the air from the seat side to the seat passages and the air from the cabin side to the cabin vent.

23. A method as set forth in claim 20 further defined as conveying the heating and cooling air from the HVAC module to the seat passages solely by an air mover in the HVAC module.

* * * * *